(12) United States Patent
Meng

(10) Patent No.: US 11,443,257 B2
(45) Date of Patent: *Sep. 13, 2022

(54) SYSTEM AND METHOD FOR SCHEDULING VEHICLES

(71) Applicant: BEIJING DIDI INFINITY TECHNOLOGY AND DEVELOPMENT CO., LTD., Beijing (CN)

(72) Inventor: Yang Meng, Beijing (CN)

(73) Assignee: BEIJING DIDI INFINITY TECHNOLOGY AND DEVELOPMENT CO., LTD., Beijing (CN)

(*) Notice: Subject to any disclaimer, the term of this patent is extended or adjusted under 35 U.S.C. 154(b) by 27 days.

This patent is subject to a terminal disclaimer.

(21) Appl. No.: 16/952,136

(22) Filed: Nov. 19, 2020

(65) Prior Publication Data
US 2021/0073710 A1 Mar. 11, 2021

Related U.S. Application Data

(63) Continuation of application No. 15/563,582, filed as application No. PCT/CN2016/100373 on Sep. 27, 2016, now Pat. No. 10,922,635.

(30) Foreign Application Priority Data

Sep. 29, 2015 (CN) .......................... 201510630991.6

(51) Int. Cl.
G06Q 10/06 (2012.01)
H04W 4/029 (2018.01)
(Continued)

(52) U.S. Cl.
CPC ..... *G06Q 10/063112* (2013.01); *G06Q 10/06* (2013.01); *G06Q 50/26* (2013.01);
(Continued)

(58) Field of Classification Search
CPC ..... G06Q 10/06311; G06Q 10/063112; G06Q 50/26; G06Q 50/30; G06Q 10/0631;
(Continued)

(56) References Cited

U.S. PATENT DOCUMENTS 5,220,653 A * 6/1993 Miro ...................... G06F 3/0601
718/107
9,965,783 B2 5/2018 Bijor et al.
(Continued)

FOREIGN PATENT DOCUMENTS

CN 101354832 A 1/2009
CN 102651167 A 8/2012
(Continued)

OTHER PUBLICATIONS

Ziqi Liao, "Taxi dispatching via Global Positioning Systems", 2001, IEEE (Year: 2001).*
(Continued)

*Primary Examiner* — Timothy Padot
*Assistant Examiner* — Reham K Abouzahra
(74) *Attorney, Agent, or Firm* — Metis IP LLC

(57) ABSTRACT

A system may include a computer-readable storage medium configured to store a first set of instructions for determining one or more candidate driver terminals to accept a service request; and a processor in communication with the computer-readable storage medium, wherein when executing the first set of instructions, the processor is directed to: establish a communication with a passenger terminal; obtain a service request including a position of the passenger terminal from the passenger terminal: determine a wireless fidelity (WiFi)
(Continued)

station based on the position of the passenger terminal; determine one or more driver terminals that access the WiFi station; determine an access instance of each of the one or more driver terminals; and determine one or more candidate driver terminals among the one or more driver terminals based on the one or more access instances of the one or more driver terminals.

20 Claims, 10 Drawing Sheets

(51) Int. Cl.
    *G08G 1/00*           (2006.01)
    *H04W 4/44*          (2018.01)
    *H04W 4/40*          (2018.01)
    *G06Q 50/26*         (2012.01)
    *H04W 4/02*          (2018.01)
    *G06Q 50/30*         (2012.01)

(52) U.S. Cl.
    CPC .............. *G06Q 50/30* (2013.01); *G08G 1/202* (2013.01); *H04W 4/02* (2013.01); *H04W 4/023* (2013.01); *H04W 4/029* (2018.02); *H04W 4/40* (2018.02); *H04W 4/44* (2018.02)

(58) Field of Classification Search
    CPC ........ G08G 1/202; H04W 4/40; H04W 4/029; H04W 4/02; H04W 4/44; H04W 4/023
    USPC ..................................................... 705/2, 7.15
    See application file for complete search history.

(56) References Cited

U.S. PATENT DOCUMENTS

| | | |
|---|---|---|
| 2003/0149598 A1 | 8/2003 | Santoso et al. |
| 2006/0045051 A1* | 3/2006 | Floros .................. H04W 74/02 370/332 |
| 2006/0276960 A1 | 12/2006 | Adamczyk et al. |
| 2008/0019312 A1* | 1/2008 | Venkatachalam ........................... H04W 72/1242 370/330 |
| 2009/0252318 A1 | 10/2009 | Smith et al. |
| 2010/0057350 A1* | 3/2010 | Joly ....................... G06Q 30/08 701/408 |
| 2010/0241349 A1 | 9/2010 | Wu |
| 2013/0247217 A1 | 9/2013 | Junod et al. |
| 2014/0200034 A1 | 7/2014 | Lee et al. |
| 2015/0161554 A1* | 6/2015 | Sweeney ........ G06Q 10/063114 705/7.15 |
| 2015/0161752 A1 | 6/2015 | Barreto et al. |
| 2015/0223024 A1 | 8/2015 | Abuodeh |
| 2015/0228000 A1* | 8/2015 | Bijor ..................... H04W 4/021 705/13 |
| 2018/0217855 A1 | 8/2018 | Strellis et al. |

FOREIGN PATENT DOCUMENTS

| | | |
|---|---|---|
| CN | 102737498 A | 10/2012 |
| CN | 102800196 A | 11/2012 |
| CN | 102819949 A | 12/2012 |
| CN | 103079169 A | 5/2013 |
| CN | 103179290 A | 6/2013 |
| CN | 103188598 A | 7/2013 |
| CN | 103456161 A | 12/2013 |
| CN | 103680128 A | 3/2014 |
| CN | 104036411 A | 9/2014 |
| CN | 104463509 A | 3/2015 |
| CN | 104717721 A | 6/2015 |
| JP | 2001344694 A | 12/2001 |
| JP | 2003337995 A | 11/2003 |
| JP | 2004046309 A | 2/2004 |
| JP | 2004046309 A * | 2/2004 |
| JP | 2004286460 A | 10/2004 |
| JP | 2006040007 A | 2/2006 |
| JP | 2013101577 A | 5/2013 |
| JP | 2015085876 A | 5/2015 |
| WO | 2003100744 A1 | 12/2003 |
| WO | 2017054706 A | 4/2017 |

OTHER PUBLICATIONS

Rui Yao, "A ridesharing simulation platform that considers dynamic supply-demand interactions", 2021, Cornell University (Year: 2021).*

International Search Report in PCT/CN2016/100373 dated Jan. 4, 2017, 5 pages.

Written opinion in PCT/CN2016/100373 dated Jan. 4, 2017, 6 pages.

Search Report in European Application No. 16850330.8 dated Jun. 7, 2018, 10 pages.

Liao, Ziqi, Taxi Dispatching via Global Positioning Systems, IEEE Transactions on Engineering Management, 48(3): 342-347, 2001.

* cited by examiner

SYSTEM AND METHOD FOR SCHEDULING VEHICLES

CROSS-REFERENCE TO RELATED APPLICATIONS

This application is a Continuation of U.S. application Ser. No. 15/563,582, filed on Sep. 30, 2017, which is a U.S. national stage under 35 U.S.C. § 371 of International Application No. PCT/CN2016/100373, filed on Sep. 27, 2016, which claims priority to Chinese Application No. 201510630991.6 filed on Sep. 29, 2015, the contents of which are incorporated herein by reference.

TECHNICAL FIELD

The present disclosure generally relates to systems and methods for on-demand service, and in particular, systems and methods for scheduling vehicles.

BACKGROUND

On-demand service has become more and more popular. In the on-demand service, especially in a vehicle scheduling service, mobile data plays an important role. But the cost of mobile data is usually very high. Besides, under certain circumstances drivers may have difficulty in accessing mobile data. The system and method to schedule vehicles effectively and improve experience of both passengers and drivers are in demand.

SUMMARY

According to exemplary embodiments of the present disclosure, a system may include a computer-readable storage medium configured to store a first set of instructions for determining one or more candidate driver terminals to accept a service request; and a processor in communication with the computer-readable storage medium, wherein when executing the first set of instructions, the processor is directed to: establish a communication with a passenger terminal; obtain a service request including a position of the passenger terminal from the passenger terminal; determine a wireless fidelity (WiFi) station based on the position of the passenger terminal; determine one or more driver terminals that access the WiFi station; determine an access instance of each of the one or more driver terminals; and determine one or more candidate driver terminals among the one or more driver terminals based on the one or more access instances of the one or more driver terminals.

According to other exemplary embodiments of the present disclosure, a method may include establishing a communication between a server and a passenger terminal; obtaining, by the server, a service request including a position of the passenger terminal from the passenger terminal; determining, by the server, a wireless fidelity (WiFi) station based on the position of the passenger terminal; determining, by the server, one or more driver terminals that access the WiFi station; determining, by the server, an access instance for each of the one or more driver terminals; and determining, by the server, one or more candidate driver terminals among the one or more driver terminals based on the one or more access instances of the one or more driver terminals.

BRIEF DESCRIPTION OF THE DRAWINGS

The present disclosure is further described in terms of exemplary embodiments. The foregoing and other aspects of embodiments of present disclosure are made more evident in the following detail description, when read in conjunction with the attached drawing figures.

DETAILED DESCRIPTION

Figure 1:
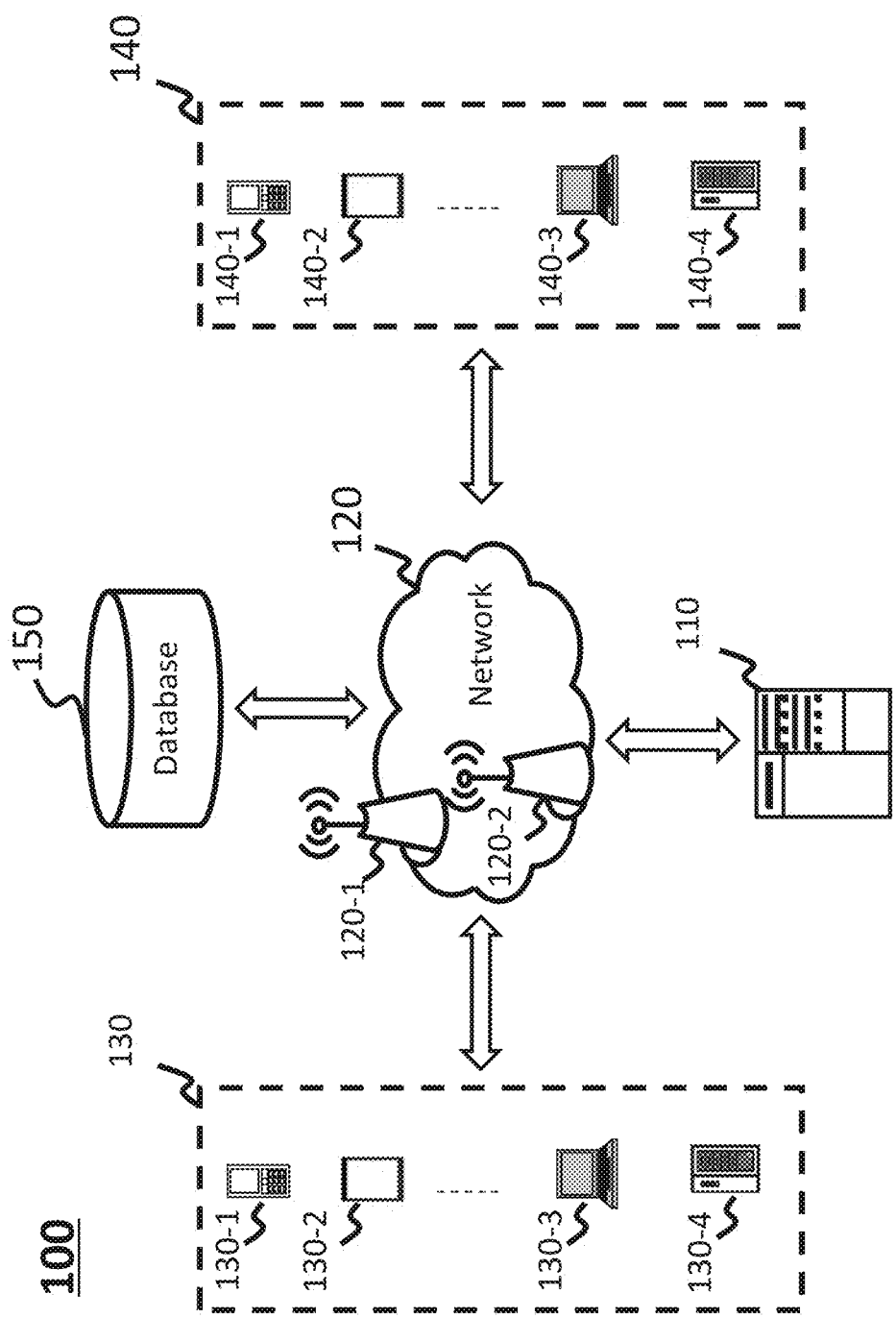
FIG. 1 is a block diagram of an exemplary system for on-demand service according to some embodiments.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprises," "comprising," "includes," and/or "including" when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawing(s), all of which form a part of this specification. It is to be expressly understood, however, that the drawing(s) are for the purpose of illustration and description only and are not intended to limit the scope of the present disclosure. It is understood that the drawings are not to scale.

The flowcharts used in the present disclosure illustrate operations that systems implement according to some embodiments in the present disclosure. It is to be expressly understood, the operations of the flowchart may or may not be implemented in order. Conversely, the operations may be implemented in inverted order, or simultaneously. Moreover, one or more other operations may be added to the flowcharts. One or more operations may be removed from the flowcharts.

Moreover, while the system and method in the present disclosure is described primarily in regard to scheduling vehicles, it should also be understood that this is only one exemplary embodiment. The system or method of the present disclosure may be applied to any other kind of on-demand service. For example, the system or method of the present disclosure may be applied to different transportation systems including land, ocean, aerospace, or the like, or any combination thereof. The vehicle of the transportation systems may include a taxi, a private car, a hitch, a bus, a train, a bullet train, a high speed rail, a subway, a vessel, an aircraft, a spaceship, a hot-air balloon, a driverless vehicle, or the like, or any combination thereof. The transportation system may also include any transportation system that applies management and/or distribution, for example, a system for sending and/or receiving an express. The application scenarios of the system or method of the present disclosure may include a webpage, a plug-in of a browser, a client terminal, a custom system, an internal analysis system, an artificial intelligence robot, or the like, or any combination thereof.

The term "passenger," "requester," "service requester," and "customer" in the present disclosure are used interchangeably to refer to an individual, an entity or a tool that may request or order a service. Also, the term "driver," "provider," "service provider," and "supplier" in the present disclosure are used interchangeably to refer to an individual, an entity or a tool that may provide a service or facilitate the providing of the service. The term "user" in the present disclosure may refer to an individual, an entity or a tool that may request a service, order a service, provide a service, or facilitate the providing of the service. For example, the user may be a passenger, a driver, an operator, or the like, or any combination thereof. In the present disclosure, "passenger" and "passenger terminal" may be used interchangeably, and "driver" and "driver terminal" may be used interchangeably.

The term "service request" and "order" in the present disclosure are used interchangeably to refer to request that may be initiated by a passenger, a requester, a service requester, a customer, a driver, a provider, a service provider, a supplier, or the like, or any combination thereof. The service request may be accepted by any one of a passenger, a requester, a service requester, a customer, a driver, a provider, a service provider, or a supplier. The service request may be chargeable, or free.

The positioning technology used in the present disclosure may include a global positioning system (GPS), a global navigation satellite system (GLONASS), a compass navigation system (COMPASS), a Galileo positioning system, a quasi-zenith satellite system (QZSS), a wireless fidelity (WiFi) positioning technology, or the like, or any combination thereof. One or more of the above positioning technologies may be used interchangeably in the present disclosure.

FIG. 1 a block diagram of an exemplary system 100 as an online platform for on-demand service according to some embodiments. System 100 may include a server 110, a network 120, a passenger terminal 130, a driver terminal 140, and a database 150.

Server 110 may run the online platform by processing information and/or data relating to the service request. For example, server 110 may determine one or more candidate driver terminals 140 based on the service request from passenger terminal 130 and one or more conditions. In some embodiments, server 110 may be a single server, or a server group. The server group may be centralized, or distributed (e.g., server 110 may be a distributed system). In some embodiments, server 110 may be local or remote. For example, server 110 may access information and/or data stored in passenger terminal 130, driver terminal 140, and/or database 150 via network 120. As another example, server 110 may be directly connected to passenger terminal 130, driver terminal 140, and/or database 150 to access stored information and/or data. In some embodiments, server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, server 110 may be implemented on a computing device having one or more components illustrated in FIG. 2 in the present disclosure.

Network 120 may facilitate exchange of information and/or data. In some embodiments, one or more components in system 100 (e.g., server 110, passenger terminal 130, driver terminal 140, and database 150) may send information and/or data to other component(s) in system 100 via network 120. For example, server 110 may obtain/acquire service request from passenger terminal 130 via network 120. In some embodiments, network 120 may be any type of wired or wireless network, or combination thereof. Merely by way of example, network 130 may include a cable network, a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, server 110 may include one or more network access points. For example, server 110 may include wired or wireless network access points such as base stations and/or internet exchange points 120-1, 120-2, . . . , through which one or more components of system 100 may be connected to network 120 to exchange data and/or information. In some embodiments, base stations and/or internet exchange points 120-1, 120-2, . . . , may be a WiFi station.

In some embodiments, a passenger may be a user of passenger terminal 130. In some embodiments, the user of passenger terminal 130 may be someone other than the passenger. For example, a user A of passenger terminal 130 may use passenger terminal 130 to send a service request for a user B, or receive service and/or information or instructions from server 110. In some embodiments, a driver may be a user of driver terminal 140. In some embodiments, the user of driver terminal 140 may be someone other than the driver. For example, a user C of driver terminal 140 may user driver terminal 140 to receive a service request for a user D, and/or information or instructions from server 110. In some embodiments, "passenger" and "passenger terminal" may be used interchangeably, and "driver" and "driver terminal" may be used interchangeably.

In some embodiments, passenger terminal 130 may include a mobile device 130-1, a tablet computer 130-2, a laptop computer 130-3, a built-in device in a motor vehicle 130-4, or the like, or any combination thereof. In some embodiments, mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, a smart glass, a smart helmet, a smart watch, a smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass, an Oculus Rift, a Hololens, a Gear VR, etc. In some embodiments, built-in device in the motor vehicle 130-4 may include an onboard computer, an onboard television, etc. In some embodiments, passenger terminal 130 may be a device with positioning technology for locating the position of the passenger and/or passenger terminal 130.

In some embodiments, driver terminal 140 may be similar to, or the same device as passenger terminal 130. In some embodiments, driver terminal 140 may be a device with positioning technology for locating the position of the driver and/or driver terminal 140. In some embodiments, passenger terminal 130 and/or driver terminal 140 may communicate with other positioning device to determine the position of the passenger, passenger terminal 130, the driver, and/or driver terminal 140. In some embodiments, passenger terminal 130 and/or driver terminal 140 may send positioning information to server 110.

Database 150 may store data and/or instructions. In some embodiments, database 150 may store data obtained/acquired from passenger terminal 130 and/or driver terminal 140. In some embodiments, database 150 may store data and/or instructions that server 110 may execute or use to perform exemplary methods described in the present disclosure. In some embodiments, database 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, database 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, database 150 may be connected to network 120 to communicate with one or more components in system 100 (e.g., server 110, passenger terminal 130, driver terminal 140, etc.). One or more components in system 100 may access the data or instructions stored in database 150 via network 120. In some embodiments, database 150 may be directly connected to or communicate with one or more components in system 100 (e.g., server 110, passenger terminal 130, driver terminal 140, etc.). In some embodiments, database 150 may be part of server 110.

In some embodiments, one or more components in system 100 (e.g., server 110, passenger terminal 130, driver terminal 140, etc.) may have a permission to access database 150. In some embodiments, one or more components in system 100 may read and/or modify information relating to the passenger, driver, and/or the public when one or more conditions are met. For example, server 110 may read and/or modify one or more users' information after a service. As another example, driver terminal 140 may access information relating to the passenger when receiving a service request from passenger terminal 130, but driver terminal 140 may not modify the relevant information of the passenger.

In some embodiments, information exchanging of one or more components in system 100 may be achieved by way of requesting a service. The object of the service request may be any product. In some embodiments, the product may be a tangible product, or an immaterial product. The tangible product may include food, medicine, commodity, chemical product, electrical appliance, clothing, car, housing, luxury, or the like, or any combination thereof. The immaterial product may include a servicing product, a financial product, a knowledge product, an internet product, or the like, or any combination thereof. The internet product may include an individual host product, a web product, a mobile internet product, a commercial host product, an embedded product, or the like, or any combination thereof. The mobile internet product may be used in a software of a mobile terminal, a program, a system, or the like, or any combination thereof. The mobile terminal may include a tablet computer, a laptop computer, a mobile phone, a personal digital assistance (PDA), a smart watch, a point of sale (POS) device, an onboard computer, an onboard television, a wearable device, or the like, or any combination thereof. For example, the product may be any software and/or application used in the computer or mobile phone. The software and/or application may relate to socializing, shopping, transporting, entertainment, learning, investment, or the like, or any combination thereof. In some embodiments, the software and/or application relating to transporting may include a traveling software and/or application, a vehicle scheduling software and/or application, a mapping software and/or application, etc. In the vehicle scheduling software and/or application, the vehicle may include a horse, a carriage, a rickshaw (e.g., a wheelbarrow, a bike, a tricycle, etc.), a car (e.g., a taxi, a bus, a private car, etc.), a train, a subway, a vessel, an aircraft (e.g., an airplane, a helicopter, a space shuttle, a rocket, a hot-air balloon, etc.), or the like, or any combination thereof.

Figure 2:
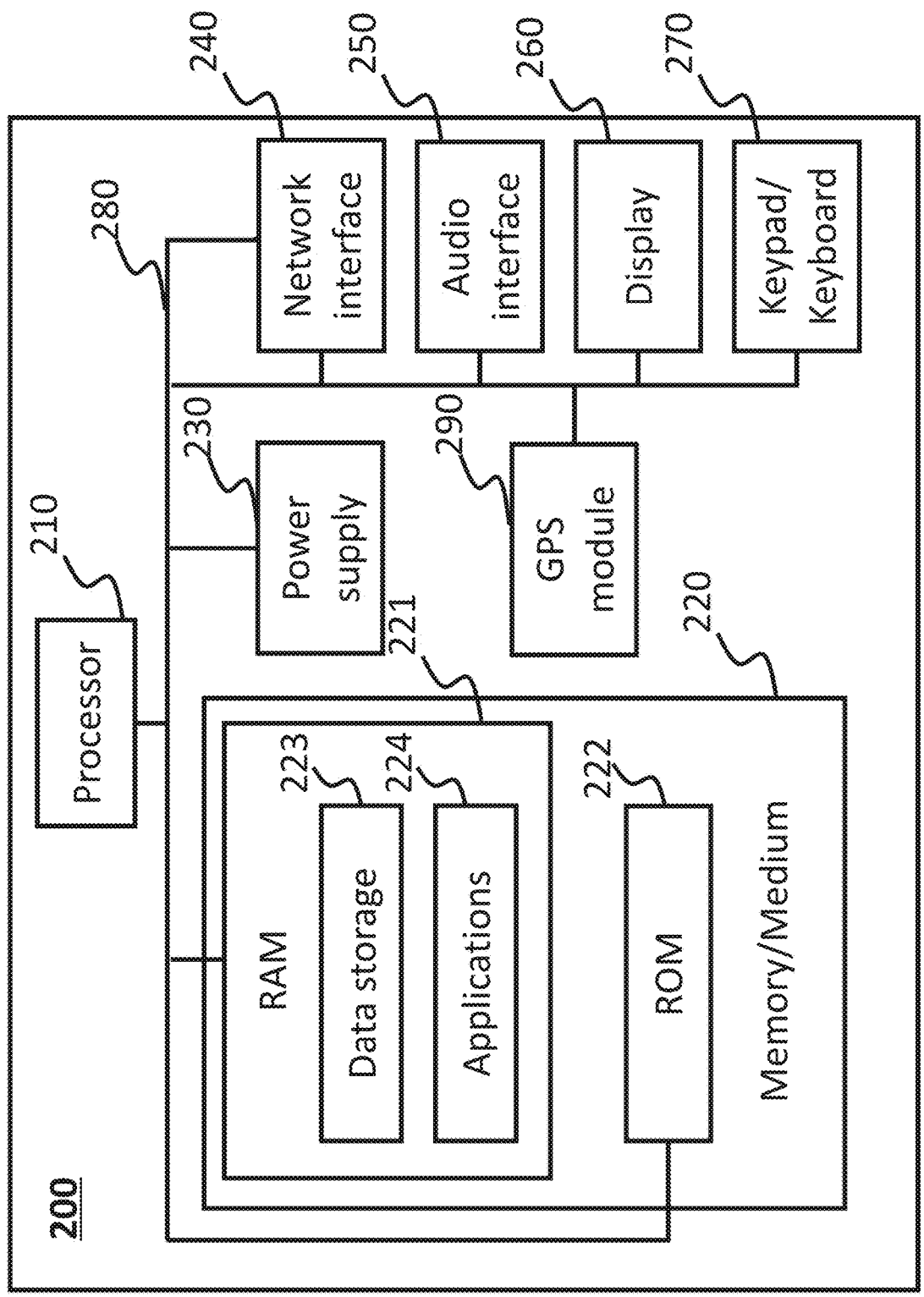
FIG. 2 is a block diagram of an exemplary computing device in the system illustrated in FIG. 1 according to some embodiments.

FIG. 2 is a block diagram of an exemplary computing device 200 in system 100 illustrated in FIG. 1 according to some embodiments. In some embodiments, server 110, passenger terminal 130, and/or driver terminal 140 may have similar or the same hardware and/or configuration as computing device 200 illustrated in FIG. 2, and one or more functions performed by server 110, passenger terminal 130, and/or driver terminal 140 described in the present disclosure may be implemented using similar or the same hardware and/or configuration as computing device 200. Computing device 200 may include a processor 210, a memory/medium 220, a power supply 230, a network interface 240, an audio interface 250, a display 260, a keypad/keyboard 270, a bus 280, and a GPS module 290.

Bus 280 may transfer information and/or data between one or more components of computing device 200. For example, bus 280 may connect processor 210 with memory/medium 220 (e.g., RAM 221, ROM 222, etc.) for exchanging information and/or data. In some embodiments, bus 280 may include a hardware component and/or a software implementation. For example, bus 280 may include a wire, an optical fiber, a cable, a communication protocol, or the like, or any combination thereof.

Processor 210 may execute instructions and/or data to perform one or more functions described in the present disclosure. For example, processor 210 may determine one or more candidate driver terminals 140 based on the service request obtained/acquired from passenger terminal 130 and condition(s). As another example, processor 210 may determine a WiFi station. As still another example, processor 210 may determine on or more driver terminals that access WiFi station. In some embodiments, processor 210 may include one or more processors (e.g., single-core processor(s) or multi-core processor(s)). Merely by way of example, processor 210 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

Memory/medium 220 may store data and/or instructions that may perform one or more functions described in the present disclosure. For example, memory/medium 220 may store instructions executed by processor 210 to determine one or more candidate driver terminals 140 based on the service request obtained/acquired from passenger terminal 130. In some embodiments, memory/medium 220 may include a random access memory (RAM) 221, and a read-only memory (ROM) 222. In some embodiments, RAM 221 may include a dynamic RAM (DRAM), a double date rate synchronous dynamic RAM (DDR SDRAM), a static RAM (SRAM), a thyristor RAM (T-RAM), and a zero-capacitor RAM (Z-RAM), or the like, or any combination thereof. In some embodiments, ROM 222 may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, or the like, or any combination thereof. In some embodiments, RAM 221 may include a data storage 223, and an application 224. In some embodiments, data storage 223 may be any hardware or software for storing data, including a circuitry, a program, etc. In some embodiments, application 224 may include a traveling application, a vehicle scheduling application, a map application, a payment application, an instant messaging application, or the like, or any combination thereof. In some embodiments, memory/medium 220 may include other storage including a mass storage (e.g., a magnetic disk, an optical disk, a solid-state drive, etc.), a removable storage (e.g., a flash drive, a floppy disk, an optical disk, a memory card, a zip disk, a magnetic tape, etc.), etc.

Power supply 230 may supply electric energy for computing device 200 (or one or more components of computing device 200). In some embodiments, power supply 230 may include a direct current (DC) power supply, an alternating current (AC) power supply, a switched-mode power supply, a programmable power supply, an uninterruptible power supply, a high voltage power supply, or any hardware or software that can supply electric energy, or any combination thereof.

Network interface 240 may be interface with network 120 and/or one or more device in system 100 (e.g., server 110, passenger terminal 130, driver terminal 140, and database 150). In some embodiments, network interface 240 may be any type of wired or wireless network interface. Merely by way of example, network interface 240 may include a cable network interface, a wireline network interface, an optical fiber network interface, a tele communications network interface, an intranet interface, an internet interface, a local area network (LAN) interface, a wide area network (WAN) interface, a wireless local area network (WLAN) interface, a metropolitan area network (MAN) interface, a wide area network (WAN) interface, a public telephone switched network (PSTN) interface, a Bluetooth network interface, a ZigBee network interface, a near field communication (NFC) network interface, or the like, or any combination thereof. In some embodiments, network interface 240 may be implemented according to programming and/or computer language(s). Network interface 240 may include circuitry for coupling computing device 200 to one or more networks, and is constructed for use with one or more communication protocols and technologies including, global system for mobile communications (GSM), code-division multiple access (CDMA), time-division multiple access (TDMA), general packet radio service (GPRS), enhanced data rate for GSM evolution (EDGE), wideband code division multiple access (WCDMA), high speed downlink packet access (HSDPA), long term evolution (LTE), user datagram protocol (UDP), transmission control protocol/Internet protocol (TCP/IP), short message service (SMS), wireless application protocol (WAP), ultra wide band (UWB), IEEE 802.16 worldwide interoperability for microwave access (WiMax), session initiated protocol/real-time transport protocol (SIP/RTP), or any of a variety of other wireless communication protocols.

Audio interface 250 may be a device for exchanging audio information or signal. In some embodiments, a user (e.g., a passenger, a driver, an operator, etc.) may input an audio via audio interface 250. In some embodiments, computing device 200 may output an audio to a user (e.g., a passenger, a driver, an operator, etc.) via audio interface 250. The audio may include information relating to service request, condition, position, time, or the like, or any combination thereof. In some embodiments audio interface 250 may include a Sony/Philips digital interface format (S/PDIF), a Radio Corporation of America (RCA) connector, a phone connector, a Alesis digital audio tape (ADAT), an Audio Engineering Society/European broadcasting union interface (AES/EBU), a bayonet Neill-Concelman (BNC) interface, or the like, or any combination thereof.

Display 260 may be an output device for presenting information in visual form. In some embodiments, display 260 may display any information in a process for scheduling vehicles for a user (e.g., a passenger, a driver, an operator, etc.). For example, display 260 may display service request for a user (e.g., a passenger, a driver, an operator, etc.). As another example, display 260 may display position information for passengers/drivers. In some embodiments, display 260 may include a liquid crystal display (LCD) panel, a light emitting diode display (LED) panel, an organic light emitting diodes (OLED) panel, a cathode ray tube (CRT) display, a plasma display, a touchscreen, a simulated touchscreen, the like, or any combination thereof.

Keypad/keyboard 270 may be an input device for typing in information from a user. In some embodiments, a user (e.g., a passenger, a driver, an operator, etc.) may input any information in the process for scheduling vehicles. For example, a user (e.g., a passenger, a driver, an operator, etc.) may input information relating to service request, condition, position, time, etc., via keypad/keyboard 270. In some embodiments, keypad/keyboard 270 may include a standard alphanumeric keyboard, a simplified alphanumeric keyboard, a flexible keyboard, a handheld keyboard, a software keyboard, an on-screen keyboard, a laser projection keyboard, a sense board, or the like, or any combination thereof.

GPS module 290 may determine a geographical location of computing device 200. In some embodiments, GPS module 290 may communicate with a GPS satellite to receive location information and/or temporal information of computing device 200. In some embodiments, GPS module 290 may determine the position of the passenger, passenger terminal 130, the driver, and/or driver terminal 140. In some embodiments, GPS module 290 may include a hardware (e.g., a chip, a circuit, etc.), and/or a software (e.g., an application, a program, etc.). In some embodiments, the application may include a traveling application, a vehicle scheduling application, a map application, an instant messaging application, or the like, or any combination thereof.

In some embodiments, computing device 200 may further include other input/output component(s). For example, computing device 200 may further include a handwritten input device, an image input device, a voice input device, an electromagnetic wave input device, a gesture input device, a motion (shake/rotate/tilt) input device, or the like, or any combination thereof.

Figure 3:
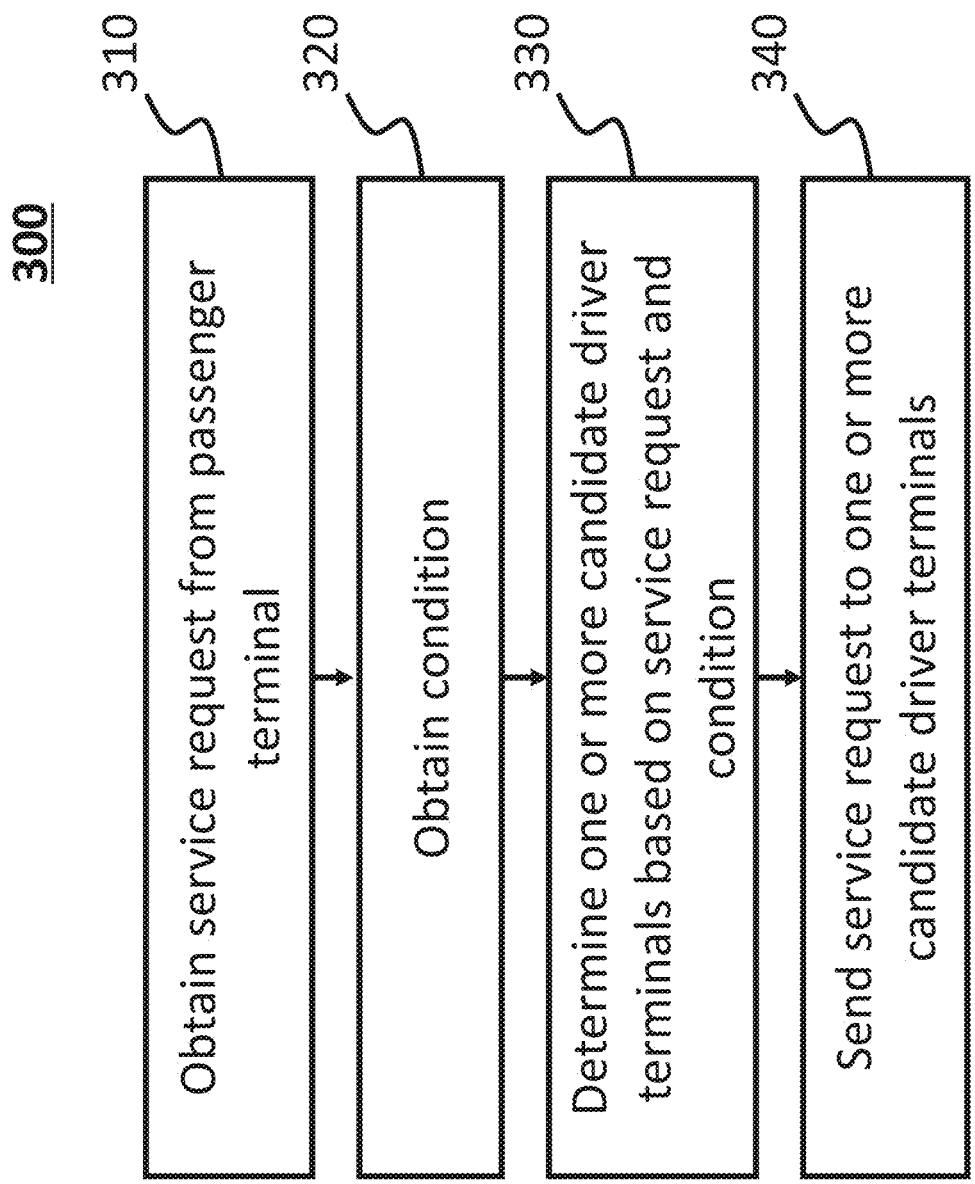
FIG. 3 is a flowchart of an exemplary process for scheduling vehicles according to some embodiments.

FIG. 3 is a flowchart of an exemplary process 300 for scheduling vehicles according to some embodiments. In some embodiments, process 300 for scheduling vehicles may be implemented in system 100 illustrated in FIG. 1. For example, process 300 may be stored in database 150 and/or storage 230 as a form of instructions, and invoked and/or implemented by processor 210.

At step 310, processor 210 may obtain/acquire a service request from passenger terminal 130. In some embodiments, a server including the processor 210 may establish a communication with a passenger terminal 130. For example, processor 210 may communicate with passenger terminal 130 via network 120 to obtain/acquire the service request. In some embodiments, the service request may include a position of passenger terminal 130, an identifier of passenger terminal 130, a starting point, a destination, a starting instance, or the like, or any combination thereof. In some embodiments, the position of passenger terminal 130 may be the same place as the starting point. For example, the position and/or the starting point may be obtained/acquired by positioning technology embedded in passenger terminal 130, for example, in the GPS module 290, as shown in FIG. 2. In some embodiments, the identifier of passenger terminal 130 may include a media access control (MAC) address, a serial number, a central processing unit (CPU) serial number, a phone number, a name, a user identity (ID) of passenger terminal 130, or the like, or any combination thereof.

At step 320, processor 210 may obtain/acquire a condition related to the service. In some embodiments, the condition may include a temporal condition, a spatial condition, an identity condition, or the like, or any combination thereof. In some embodiments, the temporal condition may include a drive time condition (e.g., a duration condition of driver terminal 140 drives to passenger terminal 130, a traffic condition that affects the drive time), an access time condition (e.g., an access instances to a network station, a time interval condition between the access instances and the current time, etc.), etc. In some embodiments, the spatial condition may include a straight-line distance condition (e.g., a straight-line distance between driver terminal 140 and passenger terminal 130), a drive distance condition (e.g., a drive distance from driver terminal 140 to passenger terminal 130, a current direction of driver terminal 140 that affects the drive distance, etc.), etc. In some embodiments, the identity condition may include a grade of driver terminal 140, an evaluation of driver terminal 140, the number of services that driver terminal 140 provides, or the like, or any combination thereof. In some embodiments, the condition may be determined by passenger terminal 130 when passenger terminal 130 requests a service. For example, the condition determined by passenger terminal 130 may be a vehicle condition (e.g., a white vehicle, a hatchback, an Audi, etc.).

At step 330, processor 210 may determine one or more candidate driver terminals 140 based on the service request and the condition. For example, processor 210 may determine one or more candidate driver terminals 140 based on the access instances of driver terminals 140 to the network station. As another example, processor 210 may determine one or more candidate driver terminals 140 based on the duration of time period during which it takes for driver terminal 140 to pick up passenger terminal 130.

At step 340, processor 210 may send the service request to the one or more candidate driver terminals 140 via network interface 240. In some embodiments, processor 210 may determine sending the service request to which candidate driver(s).

In some embodiments, processor 210 may obtain/acquire at least one acceptance of the service request from the one or more candidate driver terminals 140. In some embodiments, processor 210 may send the at least one acceptance of the service request from the one or more candidate driver terminals to passenger terminal 130 via network interface 240. In some embodiments, processor 210 may stop sending the service request to the one or more candidate driver terminals 140 via network 230 when acquiring the at least one acceptance of the service request from a driver terminal 140.

Figure 4:
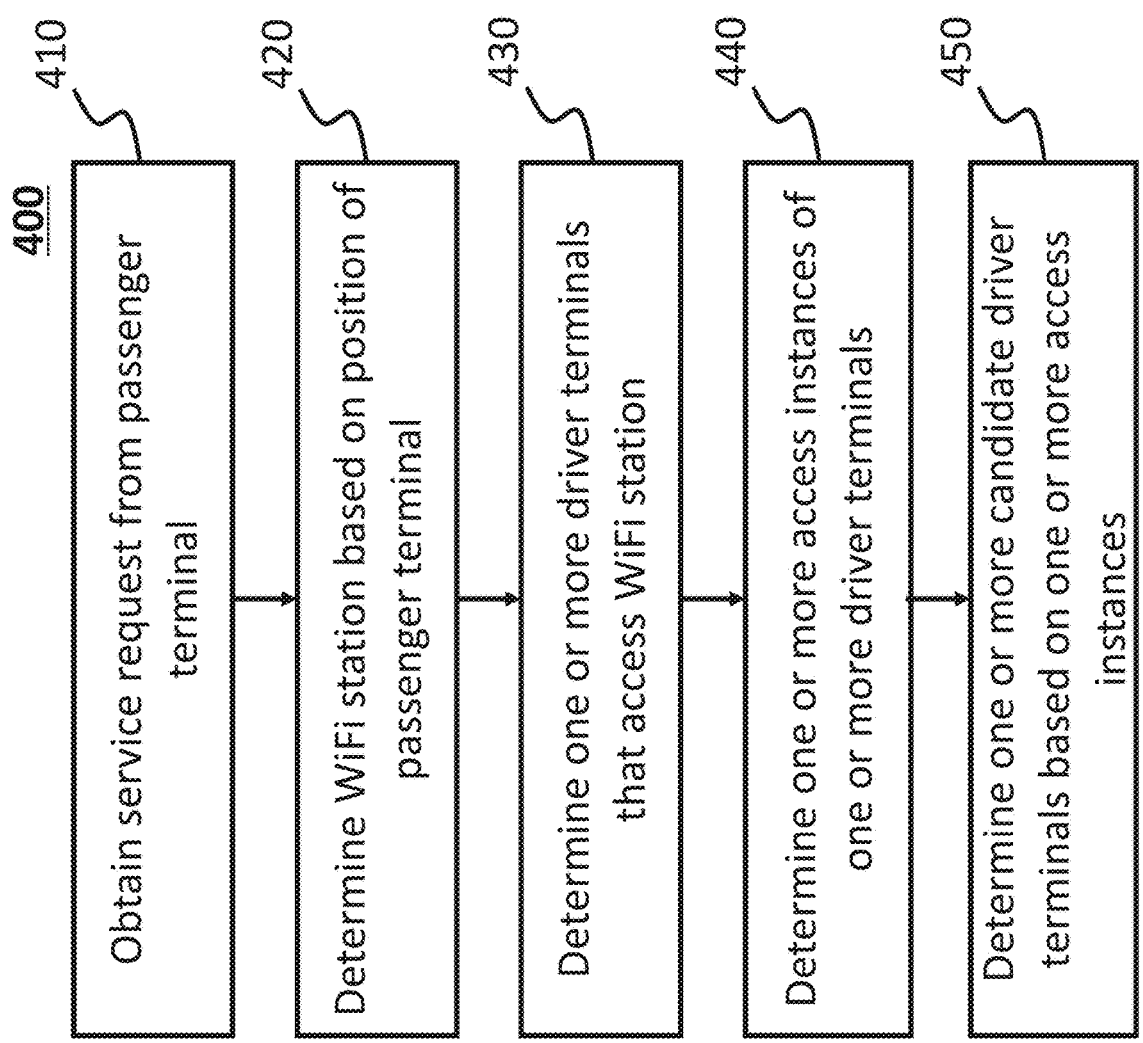
FIG. 4 is a flowchart of an exemplary process for determining one or more candidate driver terminals according to some embodiments.

FIG. 4 is a flowchart of an exemplary process 400 for determining one or more candidate driver terminals according to some embodiments. In some embodiments, process 400 may be implemented in system 100 illustrated in FIG. 1. For example, process 400 may be stored in database 150 and/or storage 230 as a form of instructions, and invoked and/or implemented by processor 210.

For illustration purpose only, "WiFi station" is used as an example of the network station when describing the exemplary method for scheduling vehicles below. The stations based on other communication protocols and/or technologies may have the same or similar functions. The communication protocol and/or technology may include global system for mobile communications (GSM), code-division multiple access (CDMA), time-division multiple access (TDMA), general packet radio service (GPRS), enhanced data rate for GSM evolution (EDGE), wideband code division multiple access (WCDMA), high speed downlink packet access (HSDPA), long term evolution (LTE), user datagram protocol (UDP), transmission control protocol/Internet protocol (TCP/IP), short message service (SMS), wireless application protocol (WAP), ultra wide band (UWB), IEEE 802.16 worldwide interoperability for microwave access (WiMax), session initiated protocol/real-time transport protocol (SIP/RTP), or any of a variety of other wireless communication protocols, or any combination thereof.

At step 410, processor 210 may obtain/acquire a service request from passenger terminal 130. For example, processor 210 may communicate with passenger terminal 130 via network 120 to obtain/acquire the service request. In some embodiments, the service request may include a position of passenger terminal 130, an identifier of passenger terminal 130, a starting point, a destination, a starting instance, or the like, or any combination thereof. In some embodiments, the position of passenger terminal 130 may be the same place as the starting point. For example, the position and/or the starting point may be acquired by positioning technology embedded in passenger terminal 130. In some embodiments, the identifier of passenger terminal 130 may include a media access control (MAC) address, a serial number, a central processing unit (CPU) serial number, a phone number, a name, a user identity (ID) of passenger terminal 130, or the like, or any combination thereof.

At step 420, processor 210 may determine and/or find a WiFi station based on the position of passenger terminal 130. In some embodiments, the position may be represented as a vector, coordinates, a matrix, or the like, or any combination thereof. In some embodiments, the WiFi station may be in a form of fixed site, or semi-fixed site. The fixed site formed WiFi stations may be placed at a fixed location of an area (e.g., an administrative region, a city, a province, a country, etc.). For example, the fixed location may include an airport, a railway station, a shopping mall, a wharf, a residential area, a commercial district, or any highly populated place, or the like, or any combination thereof. The semi-fixed site formed WiFi stations may be placed according to a frequently visited situation of people. For example, a concert or a sports event may be held at a square or a stadium, one or more semi-fixed site formed WiFi stations may be placed at the square or the stadium. In some embodiments, the semi-fixed site formed WiFi station may be movable (e.g., mounted on a vehicle). In some embodiments, the semi-fixed site formed WiFi station may be scheduled by server 110 to move to any place.

At step 430, processor 210 may determine and/or find one or more driver terminals 140 that have accessed the WiFi station determined at 420. In some embodiments, driver terminal 140 may access the WiFi station via network interface 240. In some embodiments, driver terminals 140 that within a range around the WiFi station may access the WiFi station. For example, the range may be 20 meters, 50 meters, 100 meters, 200 meters, 1000 meters, etc.

At step 440, processor 210 may determine one or more access instances of the one or more driver terminals 140. The term "access instance" in the present disclosure may refer to a time/instance that a driver terminal accesses a WiFi station. In some embodiments, the time interval between the access instances and a current time may represent a waiting duration, or a leisure duration of driver terminal 140. In this step, processor 210 may determine the access instance of each of the one or more driver terminals 140.

At step 450, processor 210 may determine one or more candidate driver terminals 140 based on the one or more access instances of the one or more driver terminals 140. In some embodiments, processor 210 may determine one or more candidate driver terminals 140 based on one or more rankings of the access instances. In some embodiments, processor 210 may determine one or more candidate driver terminals 140 based on time intervals between the one or more access instances and the current time. For example, processor 210 may determine and/or select a candidate driver terminal from the one or more driver terminal that has accessed, and still accesses, the WiFi station, and assign a priority to receive the service request to the candidate driver terminal based on the duration it has connected with the WiFi station. The longer the driver terminal has accessed to the WiFi station, meaning that the driver terminal has been in the wireless communication range of the WiFi station waiting for assigning a service request for longer time, the higher the priority may be.

Figure 5:
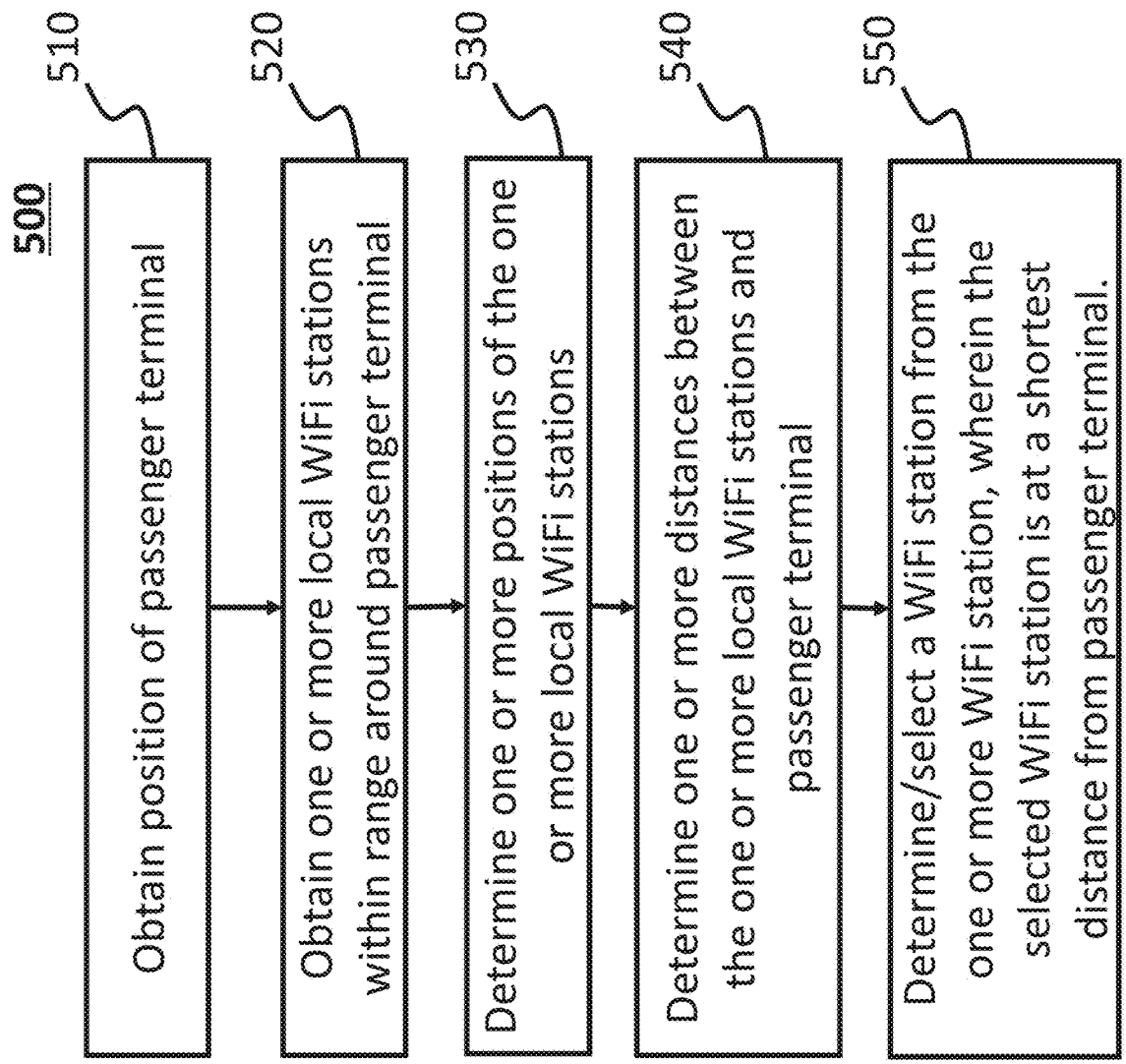
FIG. 5 is a flowchart of an exemplary process for determining a WiFi station according to some embodiments.

FIG. 5 is a flowchart of an exemplary process 500 for determining a WiFi station for a passenger terminal in order to select a driver terminal to provide a service for the passenger terminal, according to some embodiments. In some embodiments, process 500 may be implemented in system 100 illustrated in FIG. 1. For example, process 500 may be stored in database 150 and/or storage 230 as a form of instructions, and invoked and/or implemented by processor 210. In some embodiments, process 500 may be used in step 420 of process 400 illustrated in FIG. 4.

At step 510, processor 210 may obtain/acquire a position of passenger terminal 130. In some embodiments, when passenger terminal 130 sent out a service request, the request may include position information of passenger terminal 130. Therefore, the position of passenger terminal 130 may be acquired from the service request from passenger terminal 130. In some embodiments, the position of passenger terminal 130 may be represented as a vector, coordinates, a semantic phrase, a matrix, or the like, or any combination thereof.

At step 520, processor 210 may obtain/acquire and/or identify one or more local WiFi stations within a predetermined distance around passenger terminal 130 based on the position of passenger terminal 130. For example, the one or more local WiFi stations may be WiFi stations within a range of 20 meters, 50 meters, 100 meters, 200 meters, 1000 meters, etc., around passenger terminal 130.

At step 530, processor 210 may determine one or more positions of the one or more local WiFi stations. In some embodiments, the position of the local WiFi station may be represented as a vector, coordinates, a semantic phrase, a matrix, or the like, or any combination thereof. The form of representation of position of the local WiFi station may be the same as that of position of the passenger terminal 130, for example, GPS coordinates. In some embodiments, the two forms may be different.

At step 540, processor 210 may determine a distance between each of the one or more local WiFi stations and passenger terminal 130. In some embodiments, the distance may be determined based on the position of passenger terminal 130 (e.g., vector, coordinates, semantic phrase, matrix of passenger terminal 130) and the position of the one or more local WiFi stations (e.g., vector, coordinates, semantic phrase, matrix of the one or more local WiFi stations). For example, the distance between a local WiFi station and passenger terminal 130 may be determined based on coordinates of passenger terminal 130 and coordinates of the local WiFi station. In some embodiments, the one or more distances between the one or more local WiFi stations and passenger terminal 130 may be ranked in a predetermined order.

At step 550, processor 210 may determine and select a WiFi station from the one or more WiFi stations. The processor 210 may select a driver terminal to provide service for the passenger terminal from one or more driver terminals that has accessed and are still in access to the selected WiFi station. In some embodiments, the selected WiFi station may be one at a shortest distance from passenger terminal 130.

Figure 6:
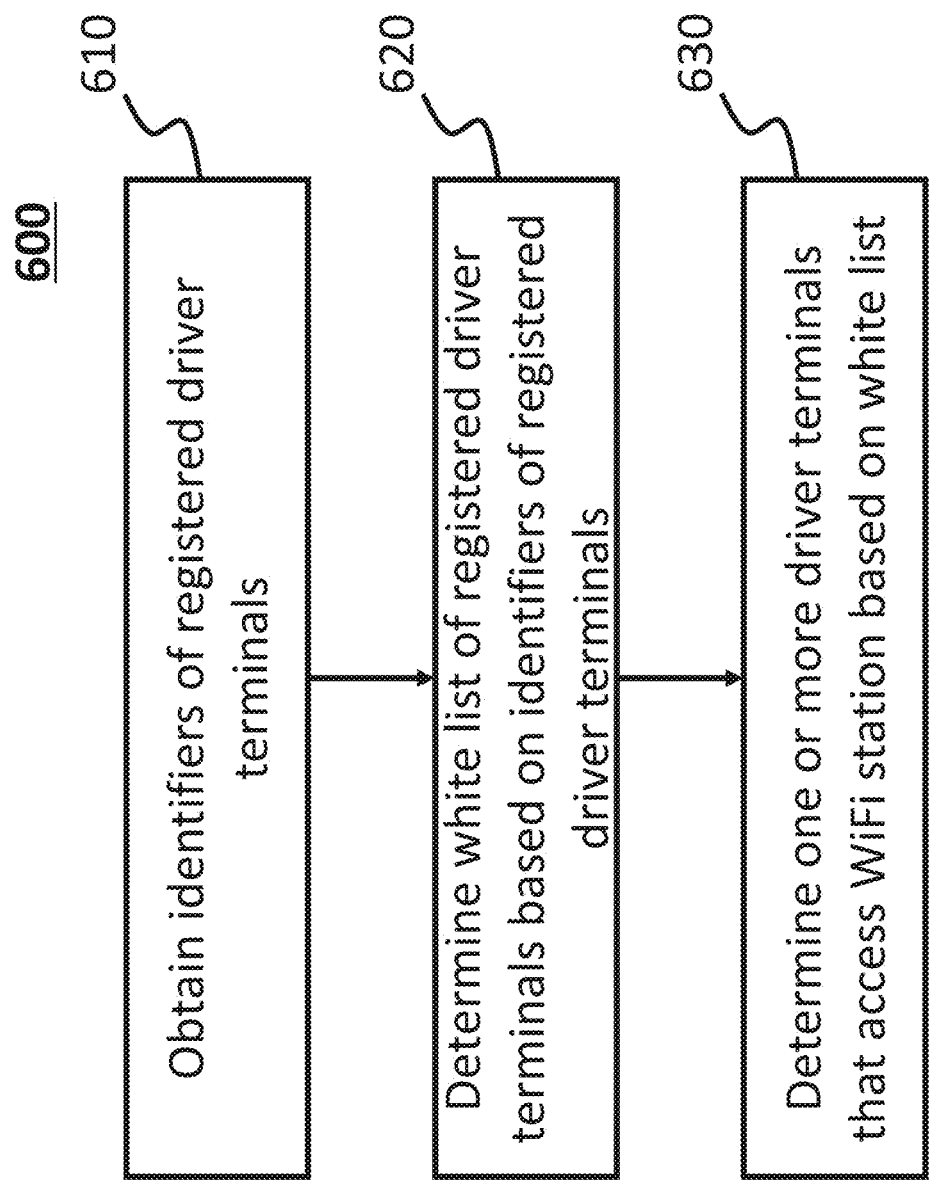
FIG. 6 is a flowchart of an exemplary process for determining one or more driver terminals that access the WiFi station according to some embodiments.

FIG. 6 is a flowchart of an exemplary process 600 for determining one or more driver terminals that access the WiFi station according to some embodiments. In some embodiments, process 600 may be implemented in system 100 illustrated in FIG. 1. For example, process 600 may be stored in database 150 and/or storage 230 as a form of instructions, and invoked and/or implemented by processor 210. In some embodiments, process 600 may be used in step 430 of process 400 illustrated in FIG. 4.

At step 610, processor 210 may obtain/acquire identifiers (e.g., identity) of registered driver terminals 140. In some embodiments, these registered driver terminals 140 may be driver terminals that are within a character distance from the selected WiFi station in FIG. 5. The character distance may be an individualized, predetermined distance of the selected WiFi station, so that only driver terminals and/or passenger terminals that are within the character distance are allowed and/or able to access the selected WiFi station. The identifiers of the registered driver terminals 140 may be stored in any storage device of system 100 (e.g., database 150, memory/medium 220, etc.). In some embodiments, the identifier of registered driver terminal 140 may include a media access control (MAC) address, a serial number, a central processing unit (CPU) serial number, a phone number, a name, a user identity (ID) of registered driver terminal 140, or the like, or any combination thereof.

At step 620, processor 210 may determine a white list of registered driver terminals 140 based on the identifiers of the registered driver terminals 140. For example, processor 210 may determine a white list of the registered driver terminals 140 based on the MAC addresses of the registered driver terminals 140. In some embodiments, the white list may include one or more driver terminals 140 that are registered in system 100. Driver terminals 140 that are not registered in system 110 may not be included in the white list. The registration in system 110 may allow the driver terminals 140 to access the WiFi station.

At step 630, processor 210 may determine one or more driver terminals 140 that access the WiFi station based on the white list of the registered driver terminals 140. In some embodiments, the one or more driver terminals 140 in the white list may be permitted to access the WiFi station. Driver terminals 140 that are not in the white list may be forbidden to access the WiFi station.

Figure 7:
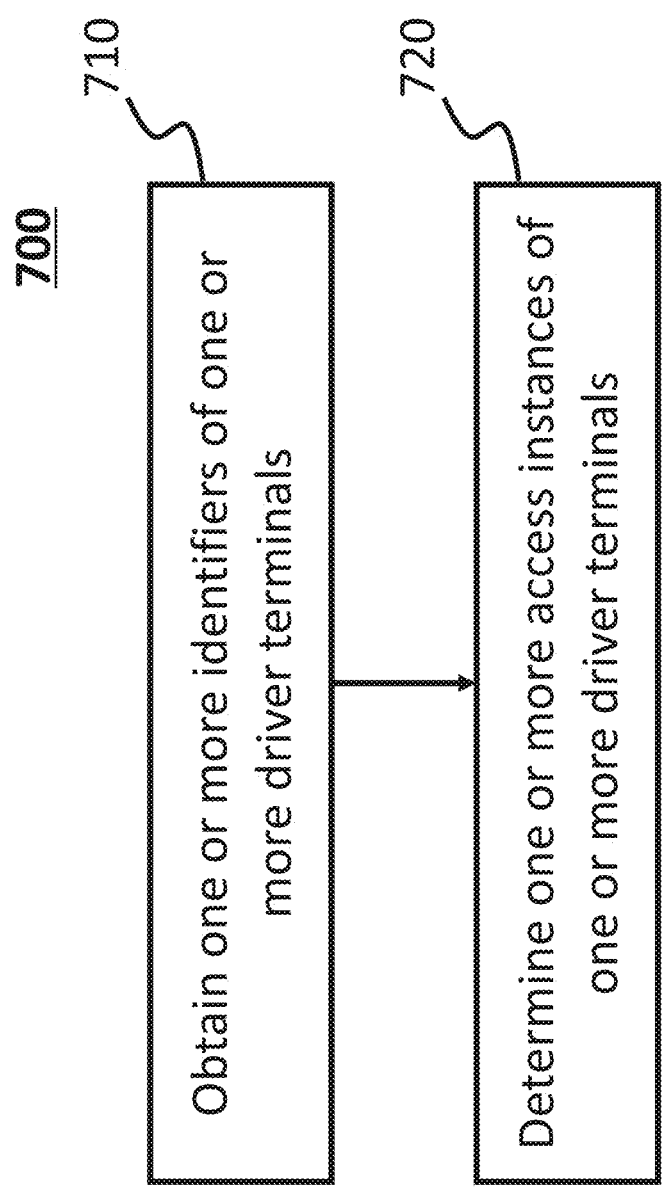
FIG. 7 is a flowchart of an exemplary process for determining one or more access instances of the one or more driver terminals according to some embodiments.

FIG. 7 is a flowchart of an exemplary process 700 for determining one or more access instances of the one or more driver terminals according to some embodiments. In some embodiments, process 700 may be implemented in system 100 illustrated in FIG. 1. For example, process 700 may be stored in database 150 and/or storage 230 as a form of instructions, and invoked and/or implemented by processor 210. In some embodiments, process 700 may be used in step 440 of process 400 illustrated in FIG. 4.

At step 710, processor 210 may obtain/acquire one or more identifiers of the one or more driver terminals 140 that access the WiFi station. In some embodiments, the identifier may include a media access control (MAC) address, a serial number, a central processing unit (CPU) serial number, a phone number, a user name, a user identity (ID), or the like, or any combination thereof.

At step 720, processor 210 may determine one or more access instances of the one or more driver terminals 140 that access the WiFi station. For example, a driver terminal A may access the WiFi station at 09:20 A.M., i.e., the driver terminal A may move within the character distance of the WiFi station and establish a wireless communication with the WiFi station at 09:20 A.M. A driver terminal B may access the WiFi station at 09:35 A.M. A driver terminal C may access the WiFi station at 09:18 A.M., etc. In some embodiments, the access instances in association with the identifiers of the driver terminals 140 may be stored in the WiFi station. In some embodiments, the access instances of the one or more driver terminals 140 that access the WiFi station may be stored with the one or more identifiers in any storage device of system 100 (e.g., database 150, memory/medium 220, etc.).

Figure 8:
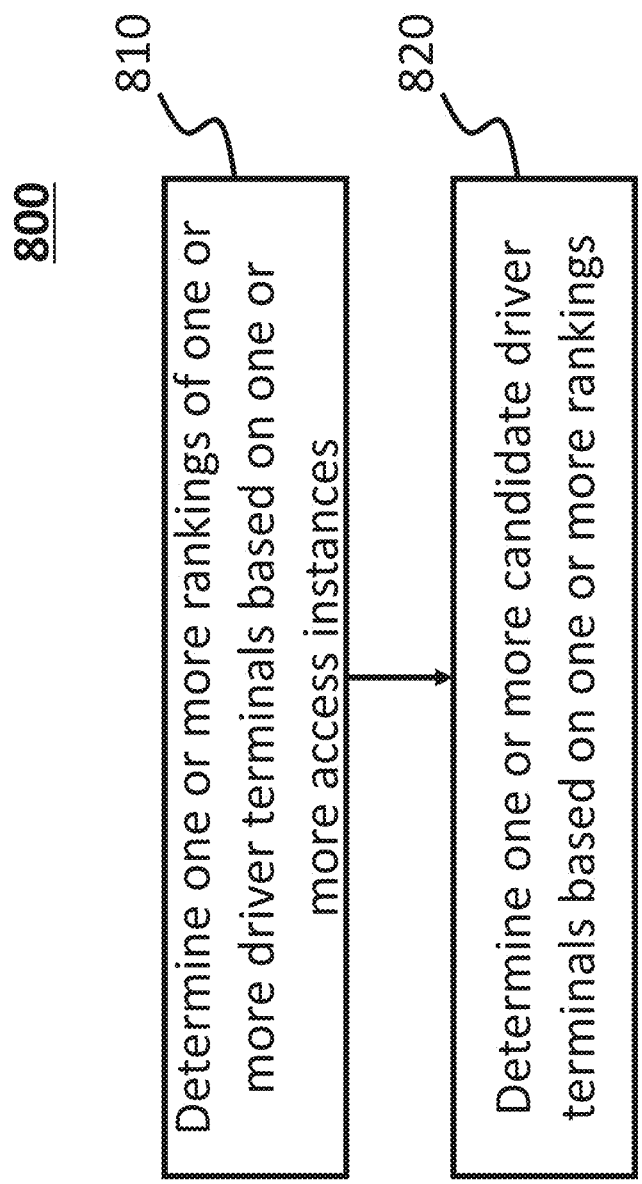
FIG. 8 is a flowchart of an exemplary process for determining one or more candidate driver terminal according to some embodiments.

FIG. 8 is a flowchart of an exemplary process 800 for determining one or more candidate driver terminals according to some embodiments. In some embodiments, process 800 may be implemented in system 100 illustrated in FIG. 1. For example, process 800 may be stored in database 150 and/or storage 230 as a form of instructions, and invoked and/or implemented by processor 210. In some embodiments, process 800 may be used in step 450 of process 400 illustrated in FIG. 4.

At step 810, processor 210 may determine one or more rankings of the one or more driver terminals 140 based on the one or more access instances. In some embodiments, the one or more rankings may be in an ascending order of the one or more access instances. For example, the ranking may be driver terminal C (access instance is 09:18 A.M.), driver terminal A (access instance is 09:20 A.M.), and driver terminal B (access instances is 09:35 A.M.). In some embodiments, the one or more rankings may be in a descending order of the one or more access instances.

At step 820, processor 210 may determine one or more candidate driver terminals 140 based on the one or more rankings. In some embodiments, the one or more candidate driver terminals 140 may include one or more driver terminals 140 in the rankings. For example, the one or more candidate driver terminals 140 may include one or more driver terminals 140 having top rankings. As another example, the one or more driver terminals 140 may include one or more driver terminals 140 having low rankings.

Figure 9:
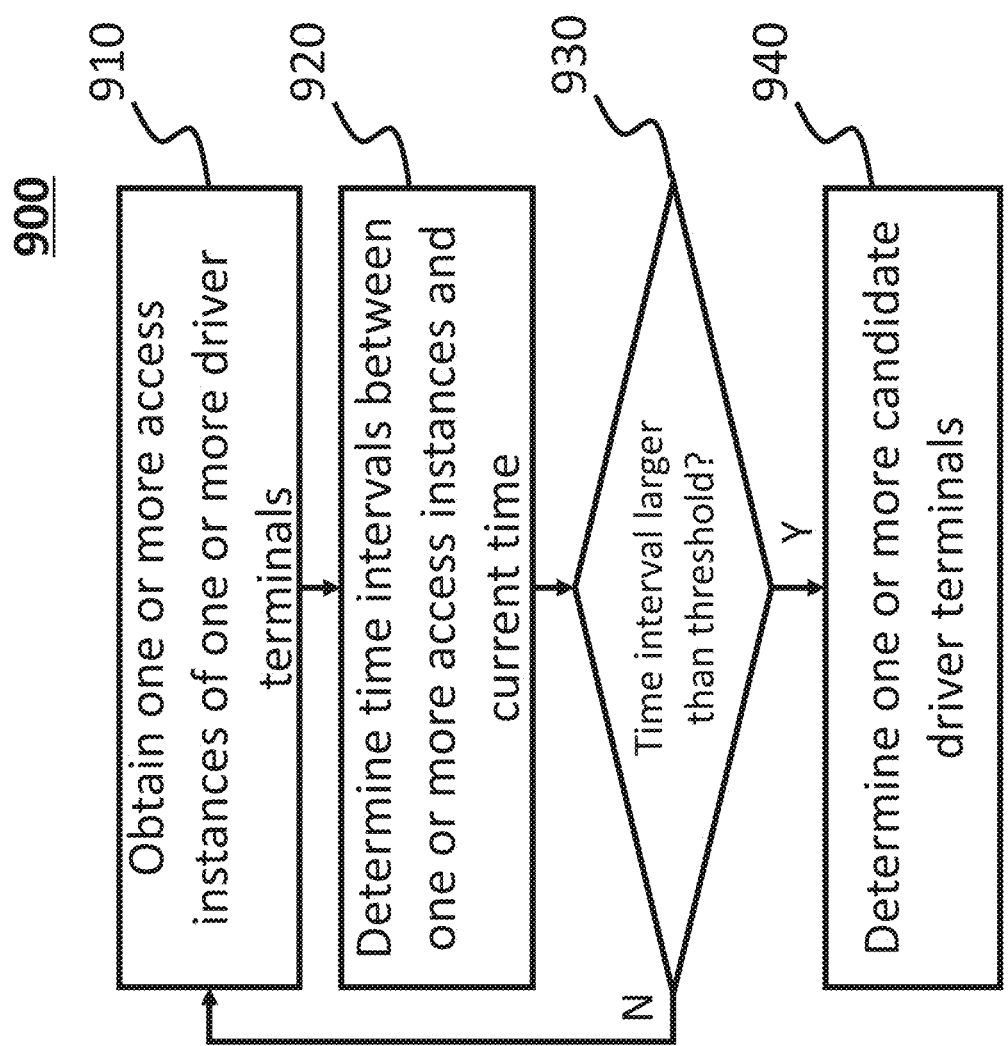
FIG. 9 is a flowchart of an exemplary process for determining one or more candidate driver terminals according to some embodiments.

FIG. 9 is a flowchart of an exemplary process 900 for determining one or more candidate driver terminals according to some embodiments. In some embodiments, process 900 may be implemented in system 100 illustrated in FIG. 1. For example, process 900 may be stored in database 150 and/or storage 230 as a form of instructions, and invoked and/or implemented by processor 210. In some embodiments, process 900 may be used in step 450 of process 400 illustrated in FIG. 4.

At step 910, processor 210 may obtain/acquire one or more access instances of the one or more driver terminals. For example, a driver terminal D may access the WiFi station at 09:20 A.M., a driver terminal E may access the WiFi station at 09:25 A.M., a driver terminal F may access the WiFi station at 09:18 A.M., etc.

At step 920, processor 210 may determine one or more time intervals between the one or more access instances and the current time. For example, the current time is 09:30

A.M., the time intervals of driver terminal D, driver terminal E, and driver terminal F may be 10 minutes, 5 minutes, and 12 minutes.

At step 930, processor 210 may determine whether the time interval is larger than a threshold. In some embodiments, the threshold may be any range of time (e.g., 30 seconds, 2 minutes, 5 minutes, 10 minutes, 15 minutes, 20 minutes, 30 minutes, 1 hour, etc.) determined according to a scenario of system 100. For example, the threshold may be 8 minutes. Processor 210 may compare the time intervals of driver terminal D (10 minutes), driver terminal E (5 minutes), and driver terminal F (12 minutes) with the threshold (8 minutes).

When the time interval is larger than the threshold, at 940, processor 210 may determine one or more candidate driver terminals 140. For example, the time interval of the driver terminal D is larger than the threshold, processor 210 may determine the driver terminal D as a candidate driver terminal 140. As another example, the time interval of the driver terminal F is larger than the threshold, processor 210 may determine the driver terminal F as a candidate driver terminal.

When the time interval is not larger than the threshold, processor 210 may go to step 910. In some embodiments, when the time interval is not larger than the threshold, processor 210 may not determine the driver terminal 140 as a candidate driver terminal 140. For example, when the time interval of the driver terminal E is not larger than the threshold, processor 210 may not determine the driver terminal E as a candidate driver terminal 140. Back to step 910, processor 210 may obtain/acquire one or more access instances of one or more other driver terminals 140.

Figure 10:
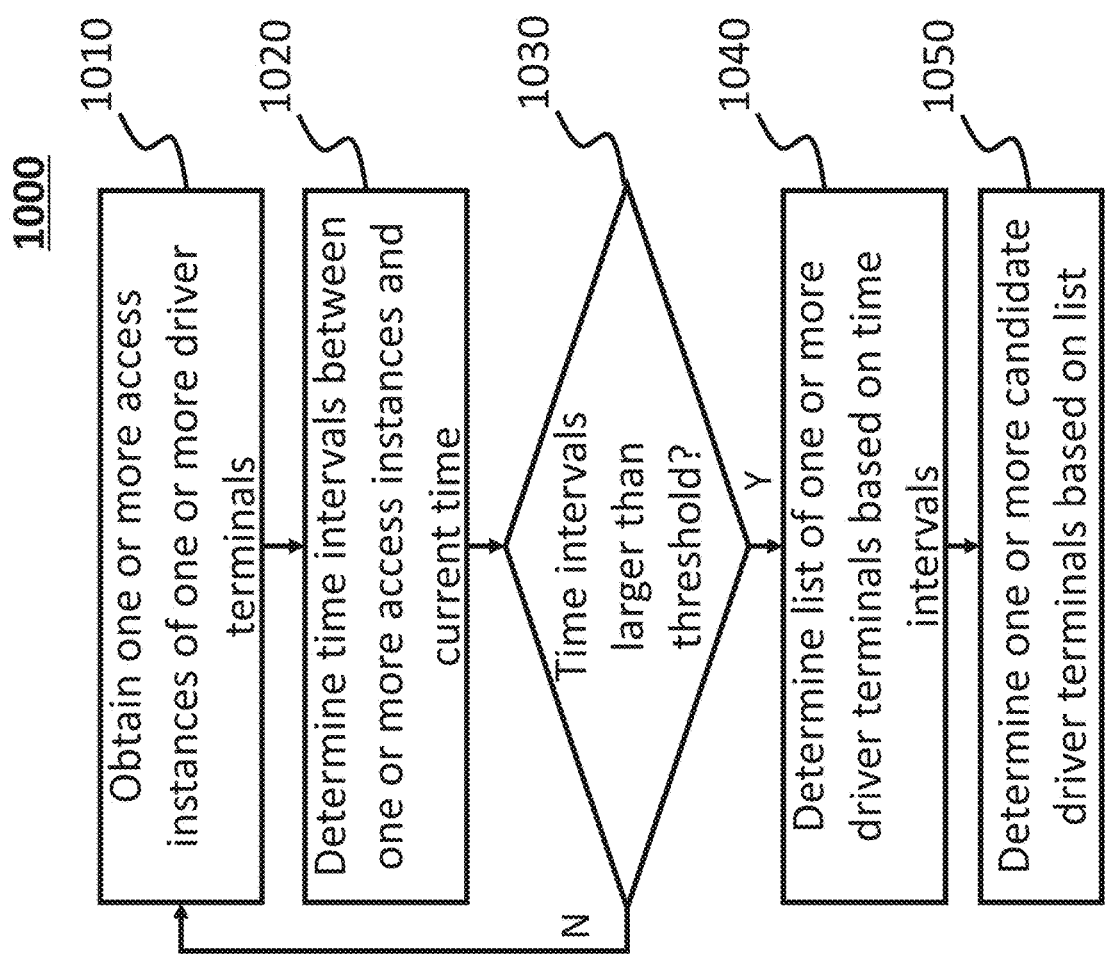
FIG. 10 is a flowchart of an exemplary process for determining one or more candidate driver terminals according to some embodiments.

FIG. 10 is a flowchart of an exemplary process 1000 for determining one or more candidate driver terminals according to some embodiments. In some embodiments, process 1000 may be implemented in system 100 illustrated in FIG. 1. For example, process 1000 may be stored in database 150 and/or storage 230 as a form of instructions, and invoked and/or implemented by processor 210. In some embodiments, process 1000 may be used in step 450 of process 400 illustrated in FIG. 4.

At step 1010, processor 210 may obtain/acquire one or more access instances of the one or more driver terminals. For example, the access instances of the driver terminal D, driver terminal E, and driver terminal F may be 09:20 A.M., 09:25 A.M., and 09:18 A.M.

At step 1020, processor 210 may determine one or more time intervals between the one or more access instances and the current time. For example, the current time is 09:30 A.M., the time intervals of driver terminal D, driver terminal E, and driver terminal F may be 10 minutes, 5 minutes, and 12 minutes.

At step 1030, processor 210 may determine whether the time interval is larger than a threshold. In some embodiments, the threshold may be any range of time (e.g., 30 seconds, 2 minutes, 5 minutes, 10 minutes, 15 minutes, 20 minutes, 30 minutes, 1 hour, etc.) determined according to a scenario of system 100. For example, the threshold may be 8 minutes. Processor 210 may compare the time intervals of driver terminal D (10 minutes), driver terminal E (5 minutes), and driver terminal F (12 minutes) with the threshold (8 minutes).

When the time interval is larger than the threshold, at step 1040, processor 210 may determine a list of the one or more driver terminals 140 based on the time intervals. In some embodiments, the list may include one or more driver terminals 140 that have larger time intervals than the threshold (e.g., driver terminal F and driver terminal D). In some embodiments, the list may include a rank of the one or more driver terminals 140. For example, the list may be in a descending order of the time intervals, such as driver terminal F (12 minutes), and driver terminal D (10 minutes). As another example, the list may be in an ascending order of the time intervals, such as driver terminal D (10 minutes), and driver terminal F (12 minutes).

At step 1050, processor 210 may determine one or more candidate driver terminals 140 based on the list. In some embodiments, the one or more candidate driver terminals 140 may include one or more driver terminals 140 in the list. For example, the one or more candidate driver terminals 140 may include one or more driver terminals 140 having top rankings in the list. As another example, the one or more candidate driver terminals 140 may include one or more driver terminals 140 having low rankings in the list.

When the time interval is not larger than the threshold, processor 210 may go to step 1010. In some embodiments, when the time interval is not larger than the threshold, processor 210 may not determine the driver terminal 140 as a candidate driver terminal 140. For example, the time interval of the driver terminal E is not larger than the threshold, processor 210 may not determine the driver terminal E as a candidate driver terminal 140. At step 1010, processor 210 may obtain/acquire one or more access instances of tone or more other driver terminals 140.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 1703, Perl, COBOL 1702, PHP, ABAP, dynamic programming languages such as Python, Ruby and Groovy, or other programming languages. The program code may execute entirely on the users computer, partly on the users computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A system for scheduling vehicles, comprising:
at least one computer-readable storage medium including a first set of instructions for determining one or more candidate driver terminal to accept a service request; and
at least one processor in communication with the computer-readable storage medium, wherein when executing the first set of instructions, the processor is directed to:
establish a communication with a passenger terminal;
receive first electrical signals encoding a service request including a position of the passenger terminal from the passenger terminal;
determine a wireless fidelity (WiFi) station based on the position of the passenger terminal;
determine one or more driver terminals that access the WiFi station, wherein the one or more driver terminals communicate with the system via the WiFi station;
determine a waiting duration of each of the one or more driver terminals, wherein the waiting duration of a driver is a time interval between a current time point and a WiFi access time point that the driver accesses the WiFi station;
determine whether the waiting duration of each of the one or more driver terminals is larger than a threshold; and
determine one or more candidate driver terminals among the one or more driver terminals whose waiting durations are larger than the threshold.

2. The system of claim 1, wherein the service request includes at least one of a starting point, a destination, or an identifier of the passenger terminal.

3. The system of claim 1, wherein to determine the WiFi station based on the position of the passenger terminal, the at least one processor is further directed to:
determine one or more local WiFi stations within a range around the position of the passenger terminal;
determine one or more positions of the one or more local WiFi stations, wherein each position corresponds to a local WiFi station;
for each of the one or more local WiFi stations, determine a distance between the local WiFi station and the passenger terminal based on the position of the passenger terminal and the position of the local WiFi station; and
determine the WiFi station among the one or more local WiFi stations, wherein the WiFi station is at a shortest distance from the passenger terminal.

4. The system of claim 1, wherein to determine the one or more driver terminals that access the WiFi station, the at least one processor is further directed to:
obtain an identifier for each of a plurality of registered driver terminals;
determine a white list of the plurality of registered driver terminals based on the plurality of identifiers of the plurality of registered driver terminals; and
determine the one or more driver terminals that access the WiFi station based on the white list.

5. The system of claim 1, wherein to determine the waiting duration of each of the one or more driver terminals, the at least one processor is further directed to:
obtain an identifier for each of the one or more driver terminals that access the WiFi station;
determine the WiFi access time point that each of the one or more driver terminals accesses the WiFi station; and determine the waiting duration of each of the one or more driver terminal based on the WiFi access time point thereof and the current time point.

6. The system of claim 1, wherein to determine the one or more candidate driver terminals, the at least one processor is further directed to:
 determine one or more rankings of the one or more driver terminals based on the one or more waiting durations, wherein each ranking is associated with a driver terminal; and
 determine the one or more candidate driver terminals based on the one or more rankings.

7. The system of claim 1, wherein when there are a plurality of driver terminals having waiting durations larger than the threshold, the at least one processor is further directed to:
 determine a ranking of the plurality of driver terminals that have the waiting duration greater than the threshold; and
 select top-ranked driver terminals from the plurality of driver terminals as the one or more candidate driver terminals.

8. The system of claim 1, wherein the computer-readable storage medium further includes a second set of instructions for broadcasting a current service request,
 wherein when the at least one processor executes the second set of instructions, the at least one processor is further directed to:
 generate and send second electrical signals encoding the service request to the one or more candidate driver terminals; and
 receive third electrical signals encoding at least one acceptance of the service request from the one or more candidate driver terminals.

9. The system of claim 1, wherein the at least one processor is further directed to:
 generate fourth electrical signals encoding the at least one acceptance of the service request from the one or more candidate driver terminals to the passenger terminal.

10. A method for scheduling vehicles, implemented on a computing device having at least one processor, at least one computer-readable storage medium, and a communication platform connected to a network, comprising:
 establishing a communication between the computing device and a passenger terminal;
 receiving first electrical signals encoding a service request including a position of the passenger terminal from the passenger terminal;
 determining a wireless fidelity (WiFi) station based on the position of the passenger terminal;
 determining one or more driver terminals that access the WiFi station, wherein the one or more driver terminals communicate with the system via the WiFi station;
 determining a waiting duration for each of the one or more driver terminals, wherein the waiting duration of a driver is a time interval between a current time point and a WiFi access time point that the driver accesses the WiFi station;
 determining whether the waiting duration of each of the one or more driver terminals is larger than a threshold; and
 determining one or more candidate driver terminals among the one or more driver terminals whose waiting durations are larger than the threshold.

11. The method of claim 10, wherein the service request includes at least one of a starting point, a destination, or an identifier of the passenger terminal.

12. The method of claim 10, wherein determining the WiFi station based on the position of the passenger terminal includes:
 determining one or more local WiFi stations within a range around the position of the passenger terminal;
 determining position of the one or more local WiFi stations, wherein each position corresponds to a local WiFi station;
 for each of the one or more local WiFi stations, determining a distance between the local WiFi station and the passenger terminal based on the position of the passenger terminal and the local WiFi station; and
 determining the WiFi station among the one or more local WiFi stations and the passenger terminal, wherein the local WiFi station is at a shortest distance from the passenger terminal.

13. The method of claim 10, wherein determining the one or more driver terminals that access the WiFi station includes:
 obtaining an identifier for each of a plurality of registered driver terminals;
 determining a white list of the plurality of registered driver terminals based on the plurality of identifiers of the plurality of registered driver terminals; and
 determining one or more driver terminals that access the WiFi station based on the white list.

14. The method of claim 10, wherein determining the waiting duration of each of the one or more driver terminals includes:
 obtaining an identifier for each of the one or more driver terminals that access the WiFi station;
 determining the WiFi access time point that each of the one or more driver terminals accesses the WiFi station; and
 determining the waiting duration of each of the one or more driver terminal based on the WiFi access time point thereof and the current time point.

15. The method of claim 10, wherein determining the one or more candidate driver terminals includes:
 determining one or more rankings of the one or more driver terminals based on the one or more waiting durations, wherein each ranking is associated with a driver terminal; and
 determining the one or more candidate driver terminals based on the one or more rankings.

16. The method of claim 10, further comprising, when there are a plurality of driver terminals having waiting durations larger than the threshold:
 determining a ranking of the plurality of driver terminals that have the waiting duration greater than the threshold; and
 selecting top-ranked driver terminals from the plurality of driver terminals as the one or more candidate driver terminals.

17. The method of claim 10, further comprising:
 generating and sending second electrical signals encoding the service request to the one or more candidate driver terminals;
 receiving third electrical signals encoding at least one acceptance of the service request from the one or more candidate driver terminals; and
 generating and sending fourth electrical signals encoding the at least one acceptance of the service request to the passenger terminal.

18. A non-transitory computer readable medium comprising instructions for scheduling vehicles, wherein the instructions are configured to cause at least one processor to:

establish a communication with a passenger terminal;

receive first electrical signals encoding a service request including a position of the passenger terminal from the passenger terminal;

determine a wireless fidelity (WiFi) station based on the position of the passenger terminal;

determine one or more driver terminals that access the WiFi station, wherein the one or more driver terminals communicate with the system via the WiFi station;

determine a waiting duration for each of the one or more driver terminals, wherein the waiting duration of a driver is a time interval between a current time point and a WiFi access time point that the driver accesses the WiFi station;

determine whether the waiting duration of each of the one or more driver terminals is larger than a threshold; and determine one or more candidate driver terminals among the one or more driver terminals whose waiting durations are larger than the threshold.

19. The non-transitory computer readable medium of claim 18, wherein the service request includes at least one of a starting point, a destination, or an identifier of the passenger terminal.

20. The non-transitory computer readable medium of claim 18, wherein to determine the WiFi station based on the position of the passenger terminal, the instructions are configured to cause at least one processor to:

determine one or more local WiFi stations within a range around the position of the passenger terminal;

determine position of the one or more local WiFi stations, wherein each position corresponds to a local WiFi station;

for each of the one or more local WiFi stations, determine a distance between the local WiFi station and the passenger terminal based on the position of the passenger terminal and the local WiFi station; and determine the WiFi station among the one or more local WiFi stations and the passenger terminal, wherein the local WiFi station is at a shortest distance from the passenger terminal.

\* \* \* \* \*